No. 848,056. PATENTED MAR. 26, 1907.
W. SCOTT.
LUBRICATING DEVICE.
APPLICATION FILED FEB. 2, 1904.
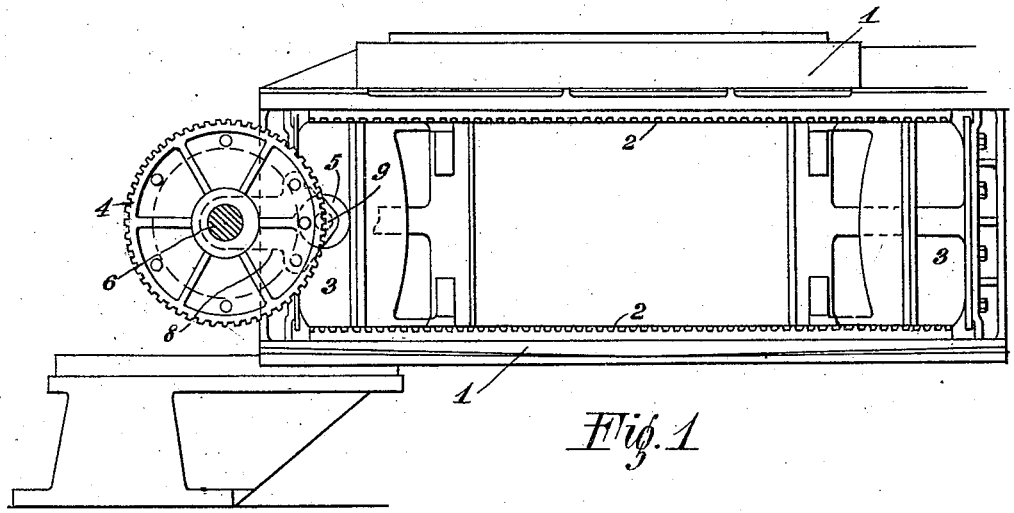
Fig. 1.
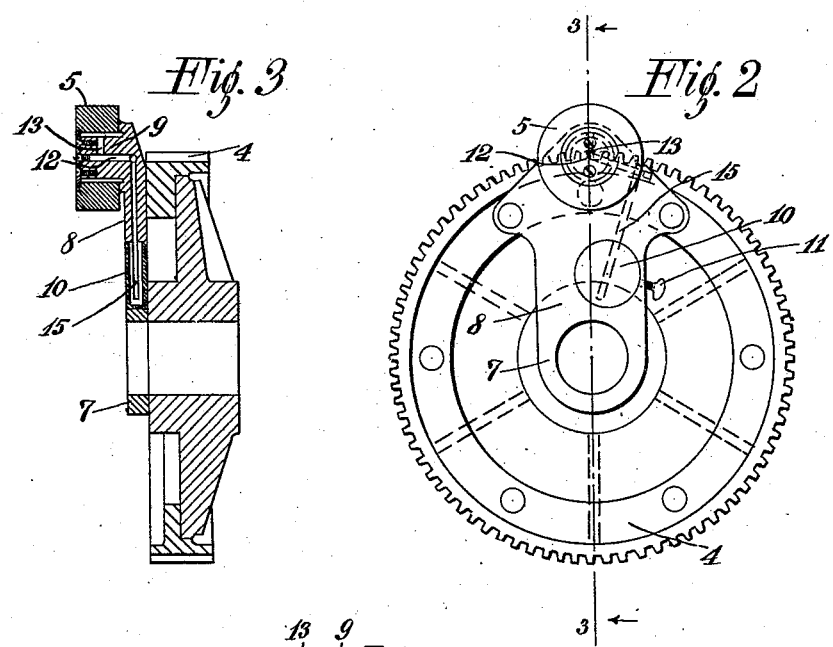
Fig. 3.   Fig. 2.
Fig. 4.
Witnesses
Ivan Konigsberg.
Annie Wasserman.
Walter Scott Inventor
By his Attorneys
Beeken & Spaulding

UNITED STATES PATENT OFFICE.

WALTER SCOTT, OF PLAINFIELD, NEW JERSEY.

LUBRICATING DEVICE.

No. 848,056.     Specification of Letters Patent.     Patented March 26, 1907.

Application filed February 2, 1904. Serial No. 191,664.

*To all whom it may concern:*

Be it known that I, WALTER SCOTT, a citizen of the United States of America, and a resident of Plainfield, Union county, New Jersey, have invented certain new and useful Improvements in Lubricating Devices, of which the following is a specification.

My invention relates generally to lubricating devices, and has more especial reference to means for lubricating shafts, spindles, or the like on machines of a peculiar construction where the parts are numerous and complicated and where the usual lubricating means cannot very well be employed.

While my invention is not limited to any particular class of machinery, it has been designed more especially to be used in connection with the parts used for effecting and reversing the bed-motion of the printing-machine.

In the drawings, Figure 1 is a view in elevation of the bed and driving means of a printing-machine, showing my invention applied. Fig. 2 is a large detail view of the driving-gear for the bed of a printing-machine, showing my invention applied. Fig. 3 is a sectional view on the line 3 3 of Fig. 2. Fig. 4 is a detail view of the member to be lubricated.

Similar characters of reference indicate corresponding parts in the different views.

1 indicates the bed of a printing or other machine, supporting in the present instance two racks 2 2 and two slots 3, one at each end. 4 is a driving-gear whose axis is relatively stationary except for a slight movement to engage and disengage with the two racks of the bed. 5 is a roll carried by the driving-gear for engaging with the slots aforesaid on the reversal of the bed. This construction of the bed-motion of the printing-press is well known and forms no part of the invention and is merely shown to facilitate the explanation of my invention.

The object of my invention is to lubricate the spindle or stud or other similar member carrying the roll 5. Inasmuch as the said roll 5 engages with the sides of the slot, it is not possible to lubricate the spindle or stud carrying the said roll in the usual manner.

Describing the parts more particularly, 6 indicates the driving-shaft, on which the driving-gear 4 is suitably mounted and which carries a hub 7, provided with an arm 8, carrying the stud or spindle 9 for supporting the roll 5. The arm 8 is provided with a source of supply of lubricant, as 10, having a removable stopper 11. 12 is an interior lubricating-duct, located in the said spindle or stud 9. From this duct 12 extends a branch duct 13 to the periphery of the said stud or spindle 9, where it connects with the spiral duct 14 on the periphery of the stud or spindle 9.

The interior lubricating-duct is suitably connected with the source of supply of lubricant, as by means of the duct 15.

It will be seen that as the driving-gear rotates, the spindle and source of supply being disposed eccentrically with relation to each other, the oil or other lubricant will flow through the ducts 15, 12, 13, and 14, thereby properly lubricating the spindle or stud 9.

What I claim is—

1. The combination of a rotatable member, a spindle to be lubricated, a friction-roll thereon, and a source of supply of lubricant, both carried by the said rotatable member, and ducts leading from the source of supply to the spindle whereby the rotation of the rotatable member causes a flow of lubricant from the source of supply to the spindle.

2. The combination of a rotatable member, a spindle to be lubricated, a friction-roll thereon, and a source of supply of lubricant, both carried by the said rotatable member, and eccentrically disposed one with relation to the other, and ducts leading from the source of supply to the spindle whereby the rotation of the rotatable member causes a flow of lubricant from the source of supply to the spindle.

Signed at New York this 29th day of January, 1904.

WALTER SCOTT.

Witnesses:
    AXEL V. BEEKEN,
    RAYMOND C. SPAULDING.